United States Patent
Braat et al.

(10) Patent No.: US 6,448,327 B1
(45) Date of Patent: Sep. 10, 2002

(54) PREPARATION PROCESS AND PROPERTIES OF STYRENE BUTADIENE RANDOM COPOLYMER/POLY(ARYLENE ETHER) COMPOSITIONS

(75) Inventors: Adrianus J. F. M. Braat, Roosendaal (NL); Benny David, Great Barrington, MA (US); Hua Guo, Delmar, NY (US); Juraj Liska, Zilina Zavodie (SK); Herb Chao, Paoli, PA (US); Kenneth P. Zarnoch, Scotia, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/644,473

(22) Filed: Aug. 23, 2000

Related U.S. Application Data (60) Provisional application No. 60/165,702, filed on Nov. 16, 1999.

(51) Int. Cl.⁷ .................................................. C08L 9/06
(52) U.S. Cl. ........................ 524/508; 525/132; 525/152
(58) Field of Search ................................. 525/152, 132; 524/508

(56) References Cited

U.S. PATENT DOCUMENTS

| | | | | |
|---|---|---|---|---|
| 3,383,340 A | | 5/1968 | MacCallum et al. ........... 260/3 |
| 4,517,341 A | * | 5/1985 | White ........................ 525/152 |
| 4,690,970 A | * | 9/1987 | Feinauer ..................... 524/504 |
| 4,835,063 A | | 5/1989 | Jadamus et al. | |
| 5,109,069 A | * | 4/1992 | Shibata ....................... 525/152 |
| 5,153,076 A | | 10/1992 | Jadamus et al. | |
| 5,332,621 A | | 7/1994 | Schmidt et al. | |
| 5,384,360 A | * | 1/1995 | Richards ..................... 525/68 |

FOREIGN PATENT DOCUMENTS

| | | |
|---|---|---|
| EP | 0 491 187 A1 | 11/1991 |
| EP | 0 562 179 A1 | 12/1992 |
| GB | 1330947 | 4/1971 |

\* cited by examiner

*Primary Examiner*—Patricia A. Short (57) ABSTRACT

An elastomer-thermoplastic composition comprising styrene butadiene random copolymer and poly(arylene ether) resin and methods of making the composition are disclosed.

14 Claims, 5 Drawing Sheets

FIG. 3
Tensile Strength

FIG. 4
Elongation

FIG. 5

PREPARATION PROCESS AND PROPERTIES OF STYRENE BUTADIENE RANDOM COPOLYMER/POLY(ARYLENE ETHER) COMPOSITIONS

CROSS REFERENCE TO RELATED APPLICATIONS

This application claims priority to Provisional Application Serial No. 60/165,702 filed on Nov. 16, 1999 which is incorporated by reference herein.

BACKGROUND OF THE INVENTION

This invention relates to elastomer compositions and methods of making elastomer compositions. More particularly it relates to elastomer-thermoplastic compositions and methods of making elastomer-thermoplastic compositions.

Often a single material cannot provide all the properties which are desired of an article of manufacture. Thus, a single chemical substance will not provide an article that simultaneously has high strength and rubber elasticity, or high hardness and stiffness, on the one hand, and high traction on the other.

When confronted by a challenge of this type, frequently the solution is to combine two materials in order to provide a new material with the requisite characteristics. Previously elastomers (rubbers) have been used in combination with thermoplastics to provide composites with elasticity and high strength. All approaches to date involve layers of the two different materials with the layers adhered to each other either by adhesive or by surface bonding.

For example. U.S. Pat. No. 4,835,063 to Jadamuss et al. discloses composite parts comprising a layer of thermoplastic which contains polyphenylene ether surrounded by a layer of styrene-butadiene rubber (SBR) or of styrene-butadiene-styrene (SBS) which is in turn, surrounded by a layer of natural rubber.

There can be an optional intermediate layer comprising a mixture of powdered SBR and filler between the SBR layer and the natural rubber layer.

U.S. Pat. No. 5,153,076 to Jadamus et al. discloses a method of chemically bonding polyphenylene ether containing material and synthetic rubber by covulcanization. The chemical bond is between the surfaces of the two materials and is achieved by contacting the two materials and subjecting them both to vulcanization conditions.

U.S. Pat. No. 5,332,621 to Schmidt et al. discloses a composite article comprising latex foam intimately bonded to a thermoplastic molded part containing polyphenylene ether. Once again the elastomeric material and the thermoplastic material are present in discrete layers.

As is clearly seen from the above patents, the approach to date for combining elastomers and thermoplastics has focused on composite materials comprised of layers of each material that are surface bonded to each other. This is due to the substantial differences in processability as well as the limited compatibility of poly(arylene ether) and rubber. The layered composite approaches do not provide a uniform property profile throughout the material which limits the applicability of these materials in situations, such as tire treads, where elasticity and high strength are important, especially at elevated temperatures.

There is an ongoing effort to improve the materials used in tire treads. Key issues are wear resistance, wet grip (traction) and rolling resistance. A tire tread with excellent properties in all three areas will be long wearing and will improve both safety and fuel economy. It is commonly believed that a higher glass transition temperature (Tg) corresponds to an improved wet grip and wear resistance although it can also result in increased rolling resistance. Tan delta (tan $\delta$), the viscoelastic loss factor (the internal friction) of a material as measured with dynamical mechanical testers, at low temperatures (typically 0° C.) should be high to improve wet grip. Tan $\delta$ at high temperatures (typically 75–80° C.) should be low to improve rolling resistance. Current tread materials have tan$\delta$ values ranging from 0.16 to 0.20 at 75° C.

Accordingly, there remains a need in the art for elastomer-thermoplastic compositions with elasticity and high strength, especially at elevated temperatures, and methods of making them.

BRIEF SUMMARY OF THE INVENTION

The above described drawbacks and disadvantages are overcome by an elastomer-thermoplastic composition and a method for making the same. The composition comprises: styrene butadiene random copolymer and poly(arylene ether) resin. Meanwhile, the method comprises combining styrene butadiene random copolymer and poly(arylene ether) in a solvent to form an emulsion, solution or suspension; and evaporating the solvent.

The above described and other features of the present invention will be appreciated and understood by those skilled in the art from the following detailed description, drawings and appended claims.

BRIEF DESCRIPTION OF THE DRAWINGS

The accompanying drawings are meant to be exemplary, not limiting.

DETAILED DESCRIPTION OF THE INVENTION

An elastomer-thermoplastic composition comprises rubber and poly(arylene ether), and optionally, carbon black. The amount of rubber is about 45 weight percent (wt %) to about 99 wt %. The amount of poly(arylene ether) is about 1 wt % to about 50 wt % The amount of carbon black is 0 wt % to about 42 wt %. When carbon black is present it is preferable for the composition to comprise about 59 to about 63 wt % rubber, about 1 wt % to about 20.5 wt % poly (arylene ether) and about 20.5 wt % to about 41 wt % carbon black, and optionally a vulcanizing agent.

In one embodiment, the rubber, especially styrene butadiene random copolymer, poly(arylene ether) and optional carbon black component are intimately mixed in solution, emulsion or suspension. In a preferred embodiment poly (arylene ether), rubber and optionally, carbon black, are intimately mixed by calendering, kneading or compounding. Both embodiments produce an elastomer-thermoplastic composition in which the thermoplastic component and the elastomer component are intimately mixed at a macromolecular level.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight within the range of about 3,000–40,000 and a weight average molecular weight within the range of about 20,000–80,000, as determined by gel permeation chromatography. The poly(arylene ether) generally has an intrinsic viscosity often between about 0.05 to about 0.60 deciliters per gram (dl/g), preferably less than about 0.35 dl/g, with about 0.05 to about 0.35 dl/g especially preferred, all as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) include poly (arylene ether) with functionalities which contain an unsaturated bond. Useful poly(arylene ether) may also include those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine systems. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the poly(arylene ether) contemplated for use in the present invention include all those presently known, irrespective of variations in structural units or ancillary chemical features.

A wide range of rubbers are useful. Useful rubber include, but are not limited to, styrene-butadiene rubber (SBR), natural rubber, butadiene rubber, isoprene rubber, nitrile rubber, isobutene-isoprene rubber, chlorinated rubber, ethylene-propylene rubber, EPDM, polybutylene rubber, acrylate rubber, and combinations comprising at least one of the foregoing rubbers. Styrene-butadiene random copolymers with a styrene content over about 9 wt % are preferred, especially when the poly(arylene ether) resin does not have a functionality capable of reacting with the rubber component.

The elastomer-thermoplastic composition can also include effective amounts of at least one additive selected from the group consisting of anti-oxidants, flame retardants, drip retardants, dyes, pigments, colorants, stabilizers, small particle mineral such as clay, mica, and talc, antistatic agents, plasticizers, lubricants, extending oils, vulcanizing agents and accelerators, age protectors, gelling agents, fillers, and mixtures thereof. These additives are known in the art, as are their effective levels and methods of incorporation. Preferred vulcanizing agents are sulfur and sulfur containing compounds. As previously discussed, the elastomer-thermoplastic composition preferably comprises carbon black. All known types of carbon black are useful.

The elastomer-thermoplastic composition may be made, in one embodiment, by forming an emulsion, solution or suspension of the rubber, poly(arylene ether), optional carbon black, optional vulcanizing agent, and desired additives, and intimately mixing, to form a mixture. Useful solvents or liquid phases include organic solvents, which are non-polar, such as toluene, xylene, and the like. The choice of solvent or liquid phase is determined by the solubility and compatibility of the materials employed. The emulsion, solution or suspension is typically made with stirring and optionally employs heat. When heat is employed, the temperature is preferably maintained below the boiling point of the solvent. The final article may be formed from the emulsion, solution or suspension by any method known in the art.

In a preferred embodiment, the elastomer-thermoplastic composition may be made by intimately mixing rubber powder and powdered poly(arylene ether) resin, and any desired additives, preferably in the presence of a sufficient amount of heat to promote the formation of a mixture. All conventional mixing equipment can be used to form the intimate mixture, although a Brabender mixer or Banbury internal mixer is preferred. Typically, the rubber and the carbon black, when present, are mixed at a temperature of about 50° C. to about 150° C., the temperature is then increased to a temperature of about 130° C. to about 250° C., and the poly(arylene ether) and other desired additives are added, except for the vulcanizing agent. The vulcanizing agent must be added at a temperature low enough to prevent premature crosslinking, typically about 110° C. or less.

The resulting material can be used in all ways knows in the art for rubber materials such as compression molding, injection moldings sheet molding, and the like. The elastomer-thermoplastic composition may be used in place of rubber in typical rubber application such as housings for pump, electrically powered tools, lamps and the like; membranes; packaging rings; sealing structures; flanges; pipe and hose couplings; rubber coated rolls; noise and vibration damping applications; adhesives; asphalt modifiers; polymer additives and tires. In addition, the elastomer-thermoplastic composition may be used in applications such as an styrene-butadiene copolymer replacement in adhesives, tires, asphalt modifiers and polymer additives.

The invention is further illustrated by the following non-limiting examples.

EXAMPLES

Examples 1–10 employ the material listed and described in Table 1.

TABLE 1

| | Material | Component |
|---|---|---|
| SBR45 | Styrene-butadiene rubber with 45 wt % styrene | Rubber |
| SBR23 | Styrene-butadiene rubber with 23 wt % styrene | Rubber |
| SBR9 | Styrene-butadiene rubber with 9 wt % styrene | Rubber |
| PAE | Poly(arylene ether) intrinsic viscosity = 0.12 dl/g | Poly-(arylene ether) |

The following examples were made by dissolving 2 grams of styrene-butadiene rubber and a varying amount of poly(arylene ether) in toluene. The amount of poly(arylene ether) varied by example as shown in Table 2. The materials were dissolved at room temperature with vigorous agitation. The resulting solution was then poured into a 6 cm diameter dish. The toluene was slowly evaporated over approximately 2–3 days resulting in a smooth film. The remaining toluene was then evaporated using a vacuum oven. The dish with the film was placed in 50° C. water for 10 minutes, removed, and air dried for two days. The films were then tested for Tg, modulus at 0° C. and modulus at 75° C. by dynamic mechanical analysis. Table 2 contains the results for Tg, modulus at 0° C. and modulus at 75° C., as well as tan δ. Examples 1–3 are comparative examples and outside the scope of the invention.

TABLE 2

| Example | SBR45 (grams) | SBR23 (grams) | SBR9 (grams) | PAE (grams) | Tg ° C. | Mod 0° C. | Mod 75° C. |
|---|---|---|---|---|---|---|---|
| 1* | | | 2 | 0 | −65 | 1.30 | 0.37 |
| 2* | | 2 | | 0 | −49 | .53 | 0.35 |
| 3* | 2 | | | 0 | −21 | 2.93 | 0.42 |
| 4 | | | 2 | 0.2 | −59 | 2.46 | 0.53 |
| 5 | | 2 | | 0.2 | −41 | 2.88 | 0.61 |
| 6 | 2 | | | 0.2 | −13 | 7.20 | 0.62 |
| 7 | 2 | | | 0.4 | −5 | 35.3 | — |
| 8 | 2 | | | 0.6 | +3 | 246 | — |
| 9 | 2 | | | 0.8 | +16 | 599 | — |
| 10 | 2 | | | 1.0 | +27 | 827 | — |

*Comparative examples, outside the scope of the invention.

Examples 4–10 generally show increased Tg and modulus when compared to the comparative Examples 1–3.

TABLE 3

| Material | Component |
|---|---|
| Styrene-butadiene Rubber (SBR) with 23.5 wt % styrene | Rubber resin |
| Butadiene Rubber (BR) | Rubber resin |
| Poly(arylene ether) IV = 0.12 dl/g | Poly(arylene ether) |
| Carbon Black | Filler |
| Zinc Oxide | Cure Activator |
| Stearic Acid | Cure Activator |
| N-cyclohexyl-2-benzothiazolylsulfenamide (CBS) | Cure Accelerator |
| Sulfur | Vulcanization Agent |

Examples 11–19 contain the materials listed and described in Table 3.

Examples 11–17 were made by combining the rubber components with the carbon black at 130° C. in a Brabender mixer (60 rpm) for approximately 3 minutes. The temperature was then increased to 170° C. and the remaining ingredients were added, except for the sulfur, and mixed for approximately 4 minutes. Examples 18–19 were made by combining all components except sulfur at 130° C. in a Brabender mixer for approximately 3 minutes. The temperature of the mixture for Examples 11–19 were decreased to less than 110° C. Sulfur was then added and mixed (40 rpm) for approximately 3 minutes. The resulting material was then molded into bars and cured at 155–160° C. for 15 minutes and subjected to testing. The bars were tested for percent elongation (% elongation) modulus at 10%, 100%, 200% and 300% elongation, and tensile strength by ASTM D412. Formulations of the examples are shown in Table 4. The amounts in Table 4 are shown in grams. Examples 18 and 19 are comparative examples. They do not contain poly(arylene ether) and as such are outside the scope of the invention.

TABLE 4

| Example | SBR | BR | Poly (arylene ether) | Carbon Black | ZnO₂ | Stearic Acid | CBS | Sulfur |
|---|---|---|---|---|---|---|---|---|
| 11 | 23.2 | 7.7 | 10.5 | 10.5 | 0.93 | 0.62 | 0.50 | 0.62 |
| 12 | 25.6 | 8.5 | 7.2 | 10.3 | 1.02 | 0.68 | 0.55 | 0.68 |
| 13 | 24.1 | 8.0 | 7.9 | 13.2 | 0.96 | 0.64 | 0.51 | 0.64 |

TABLE 4-continued

| Example | SBR | BR | Poly (arylene ether) | Carbon Black | ZnO$_2$ | Stearic Acid | CBS | Sulfur |
|---|---|---|---|---|---|---|---|---|
| 14 | 24.4 | 8.1 | 8.9 | 10.5 | 0.97 | 0.65 | 0.52 | 0.65 |
| 15 | 26.0 | 8.7 | 2.2 | 18.2 | 1.04 | 0.69 | 0.56 | 0.69 |
| 16 | 26.4 | 8.8 | 3.7 | 14.4 | 1.06 | 0.70 | 0.56 | 0.70 |
| 17 | 24.2 | 8.1 | 5.5 | 17.0 | 0.97 | 0.65 | 0.52 | 0.65 |
| 18* | 25.5 | 8.5 | 0.0 | 23.6 | 1.02 | 0.68 | 0.54 | 0.68 |
| 19* | 26.4 | 8.8 | 0.0 | 21.2 | 1.06 | 0.70 | 0.56 | 0.70 |

*Comparative examples, outside the scope of the invention

Figure 1:
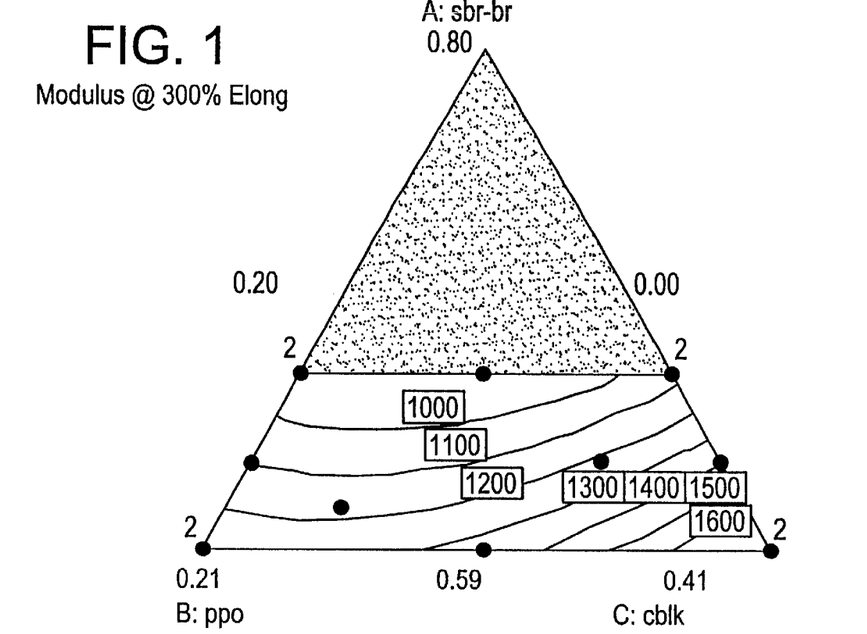
FIG. 1 is a graphic illustration of modulus (stress) at 100% elongation for one embodiment of the present invention (Example 17) and two prior art comparative examples (Examples 18 and 19) showing contours of about 60 to about 110 pounds per square inch (psi).
Figure 2:
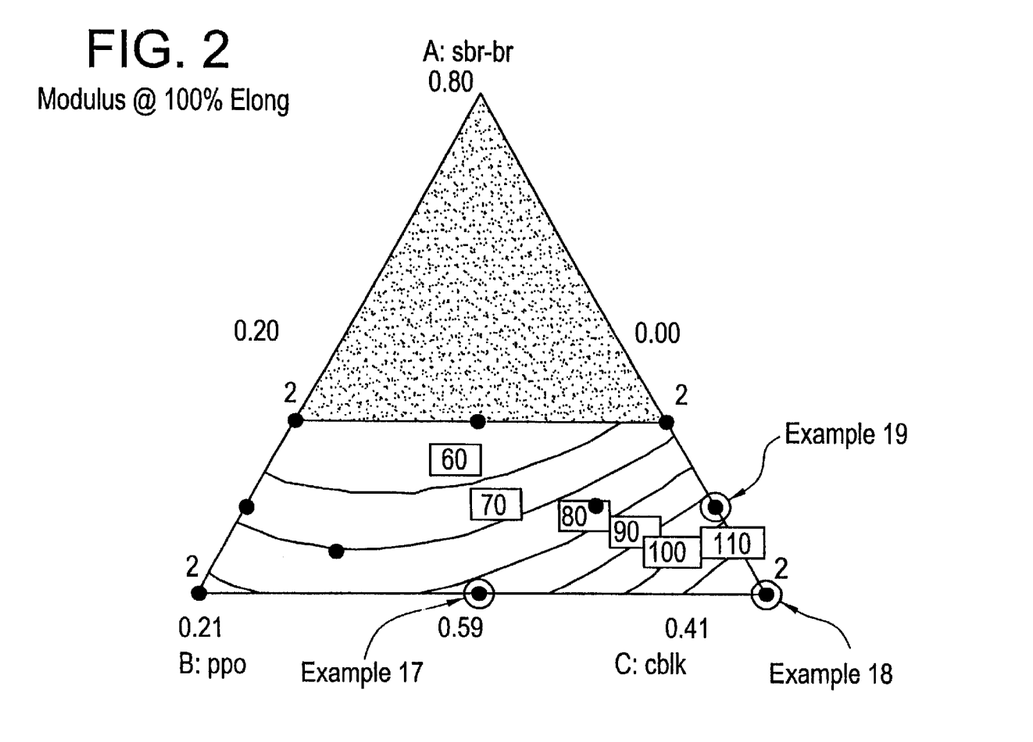
FIG. 2 is a graphic illustration of modulus (stress) at 300% elongation for one embodiment of the present invention (Example 17) and two prior art comparative examples (Examples 18 and 19) showing contours of about 1,000 to about 1,600 psi.
Figure 3:
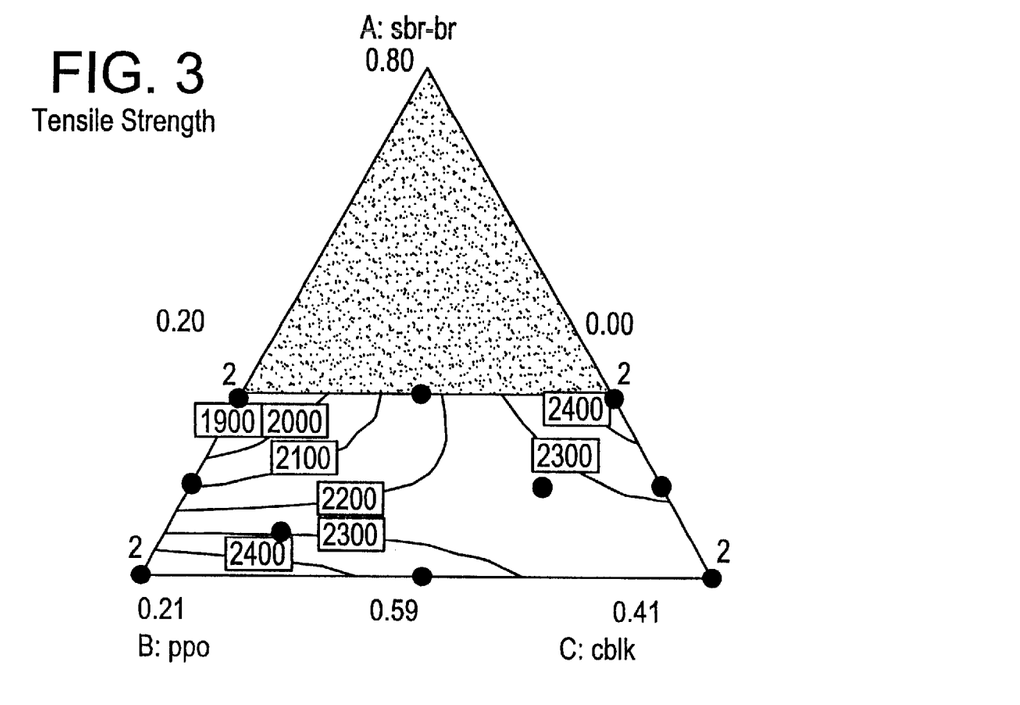
FIG. 3 is a graphic illustration of tensile strength at 23° C. illustrating that a peak in the property exists with the addition of poly(arylene ether) to the composition.
Figure 4:
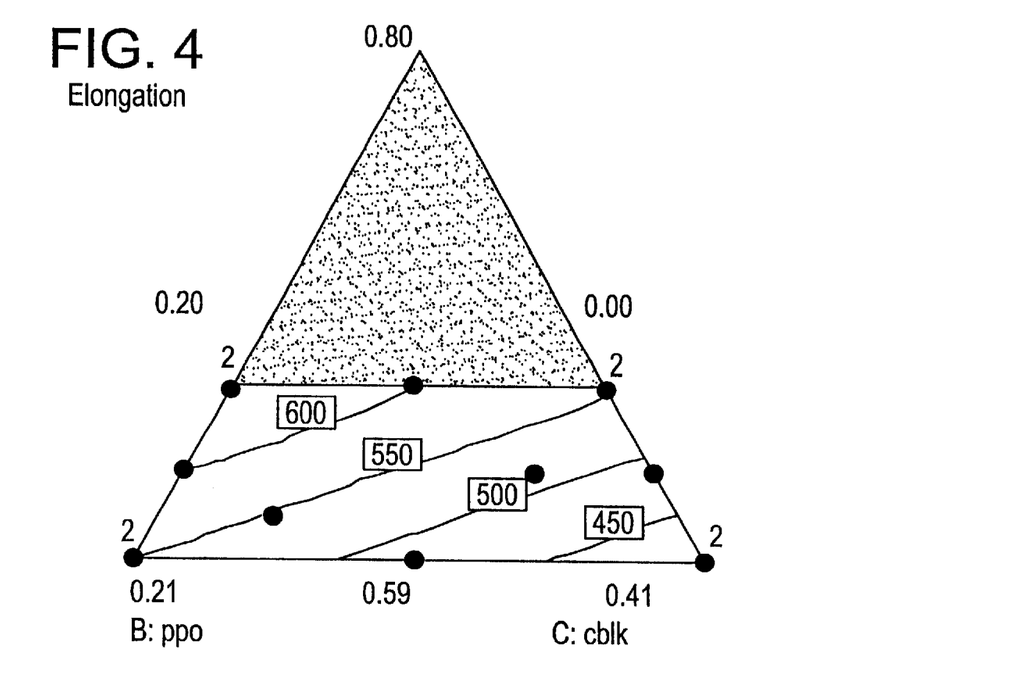
FIG. 4 is a graphical illustration of elongation showing that elongation is increased with the removal of the filler.
Figure 5:
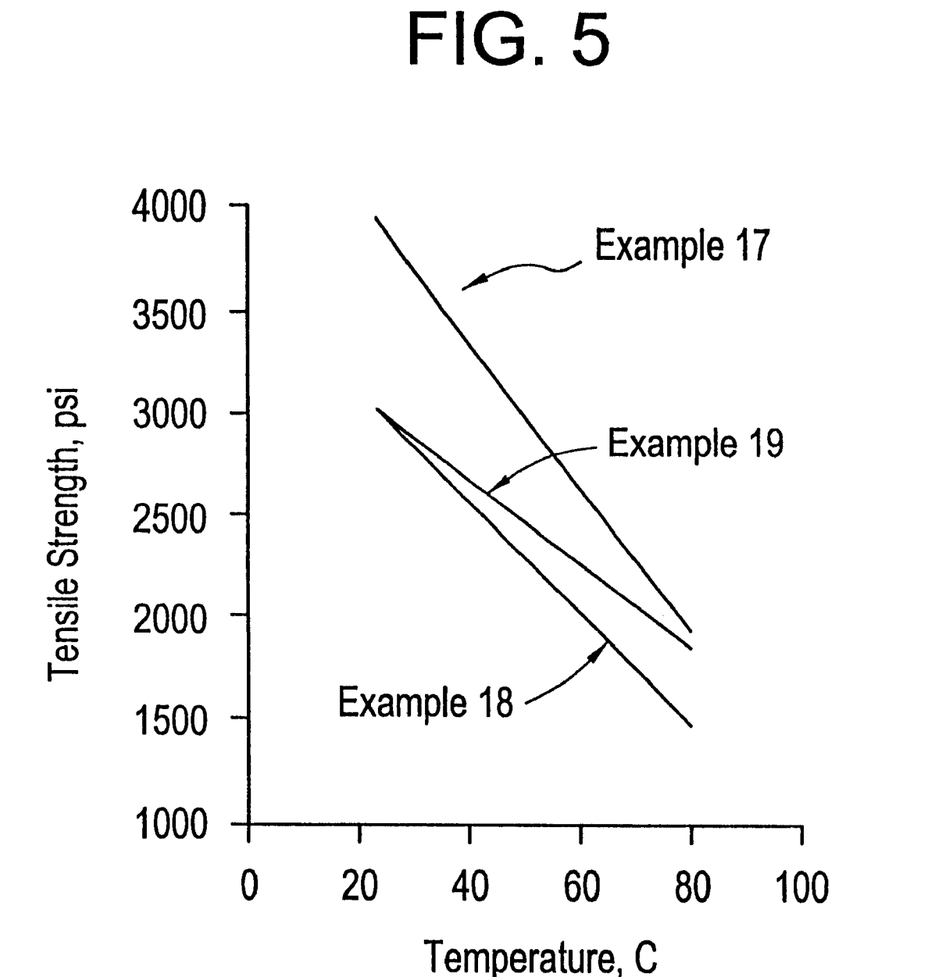
FIG. 5 is a graphical representation of tensile strength versus temperature.

Results of the testing are shown in Table 5 and in FIGS. 1–4. FIG. 1 illustrates contours of about 1,000–1,600 psi for modulus (stress) at 300% elongation. while FIG. 2 illustrates contours of about 60–110 psi for modulus (stress) at 100% elongation. FIG. 3 confirms that there is a peak in tensile strength with the addition of PPE to the formulation, while FIG. 4 illustrates that the elongation is increased by the removal of the filler. FIG. 5 sets forth the relationship of tensile strength to temperature.

TABLE 5

| Example | % Elongation | Modulus (psi) 10% | 100% | 200% | 300% | $^1$Tensile Strength (psi) 23° C. |
|---|---|---|---|---|---|---|
| 11 | 620.8 | 80.7 | 424.1 | 811.2 | 1,271.9 | 2,573.4 |
| 12 | 547.0 | 49.3 | 303.6 | 585.0 | 952.7 | 1,891.4 |
| 13 | 542.8 | 77.8 | 387.2 | 743.4 | 1,231.8 | 2,359.5 |
| 14 | 537.8 | 64.4 | 344.0 | 663.0 | 1,081.1 | 2,041.6 |
| 15 | 481.1 | 68.3 | 374.2 | 734.2 | 1,237.3 | 2,019.4 |
| 16 | 576.5 | 51.7 | 302.5 | 573.1 | 955.8 | 2,052.3 |
| 17 | 537.8 | 81.2 | 374.9 | 738.2 | 1,273.3 | 2,494.3 |
| 18* | 320.1 | 128.0 | 575.7 | 1,145.7 | 1,832.5 | 1,953.7 |
| 19* | 528.4 | 88.6 | 404.2 | 788.2 | 1,324.7 | 2,505.4 |

*Comparative examples, outside the scope of the invention.
$^1$large tensile bars: 4.5 inches overall length; 0.250 inches width; 1.5 inches gage length.

Figure 6:
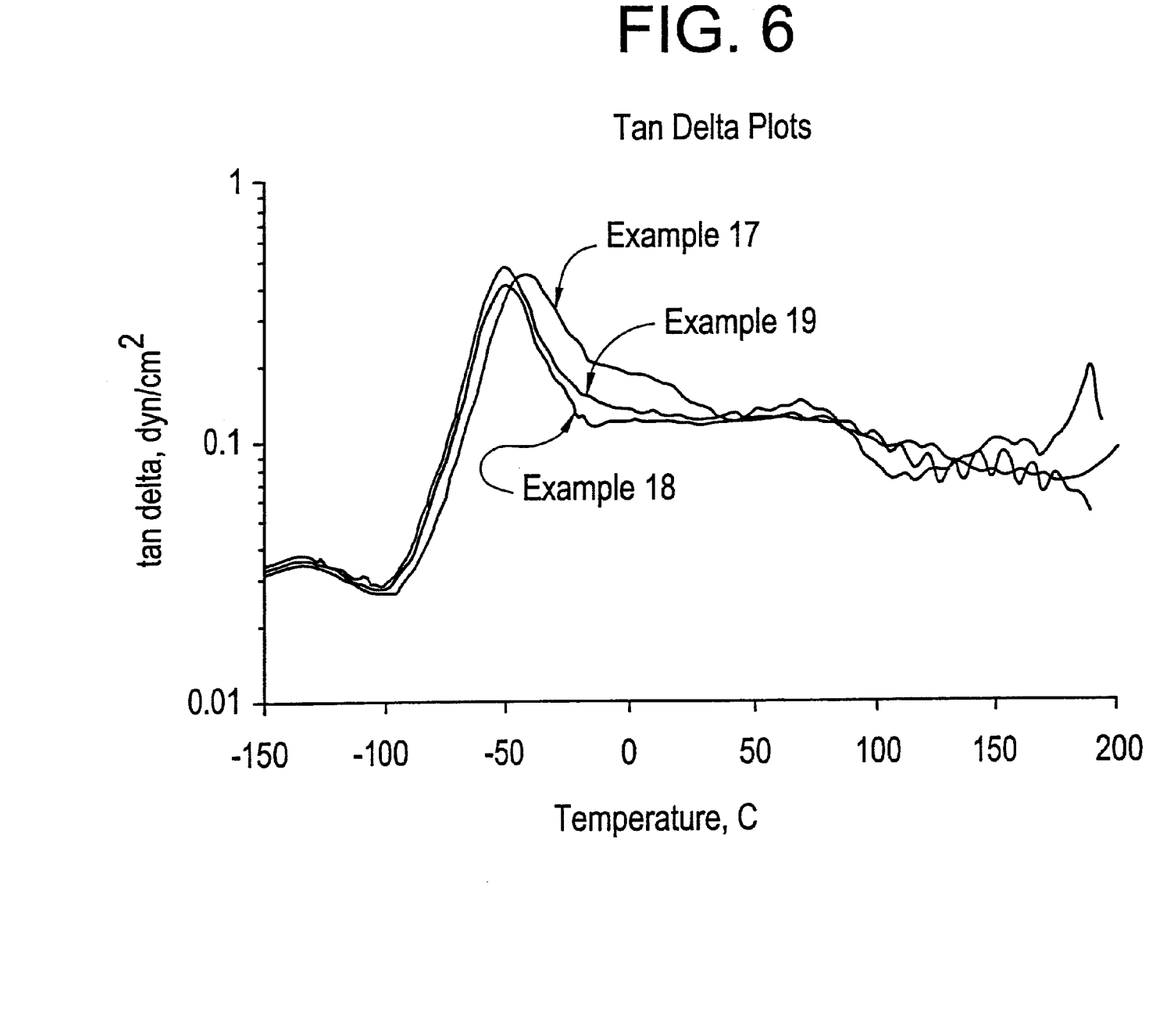
FIG. 6 is a graphical representation of tan delta versus temperature for one embodiment of the present invention (Example 17) and two prior art comparative examples (Examples 18 and 19).

With respect to FIG. 6, the tests were performed on a Rheometrics Dynamic Spectrometer Model 7700, in Torsion Rectangular geometry. At a frequency of 10 rad/s, a strain of 0.07% was applied to the sample. A temperature ramp was run starting at −150° C. up to 200° C. at 2 degrees per minute. As the sample goes through its transition (approx. −40° C.) the strain was raised to 0.3% to keep the torque signal within the workable range of the rheometer. This figure illustrates that the Tg shifts about +10° C. with PPE present. (Note, due to the high noise level, differences in the 50° C. to 70° C. are difficult to observe.)

TABLE 6

| Example | $^2$Tensile Strength (psi) 23° C. | 80° C. | Tanδ at 80° C. | Tanδ at 0° C. | Tg ° C. |
|---|---|---|---|---|---|
| 17 | 3,954 | 1,913 | 0.13 | 0.18 | −39 |
| 18* | 3,021 | 1,451 | 0.12 | 0.12 | −49 |
| 19* | 3,036 | 1,836 | 0.12 | 0.13 | −51 |

*Comparative examples, outside the scope of the invention.
$^2$small tensile bars: 2.0 inches overall length; 0.125 inches width; radial gage length Examples 11–17 exhibit a generally high tensile strength. Example 17 has a Tg which is at least 10° C. higher than the comparative materials. The tan δ at 80° C. of Example 17 is lower than current tire tread materials and the tan δ at 0° C. is higher than the comparative examples. The percent elongation and modulus values are comparable to those of the comparative materials.

Figure 7:
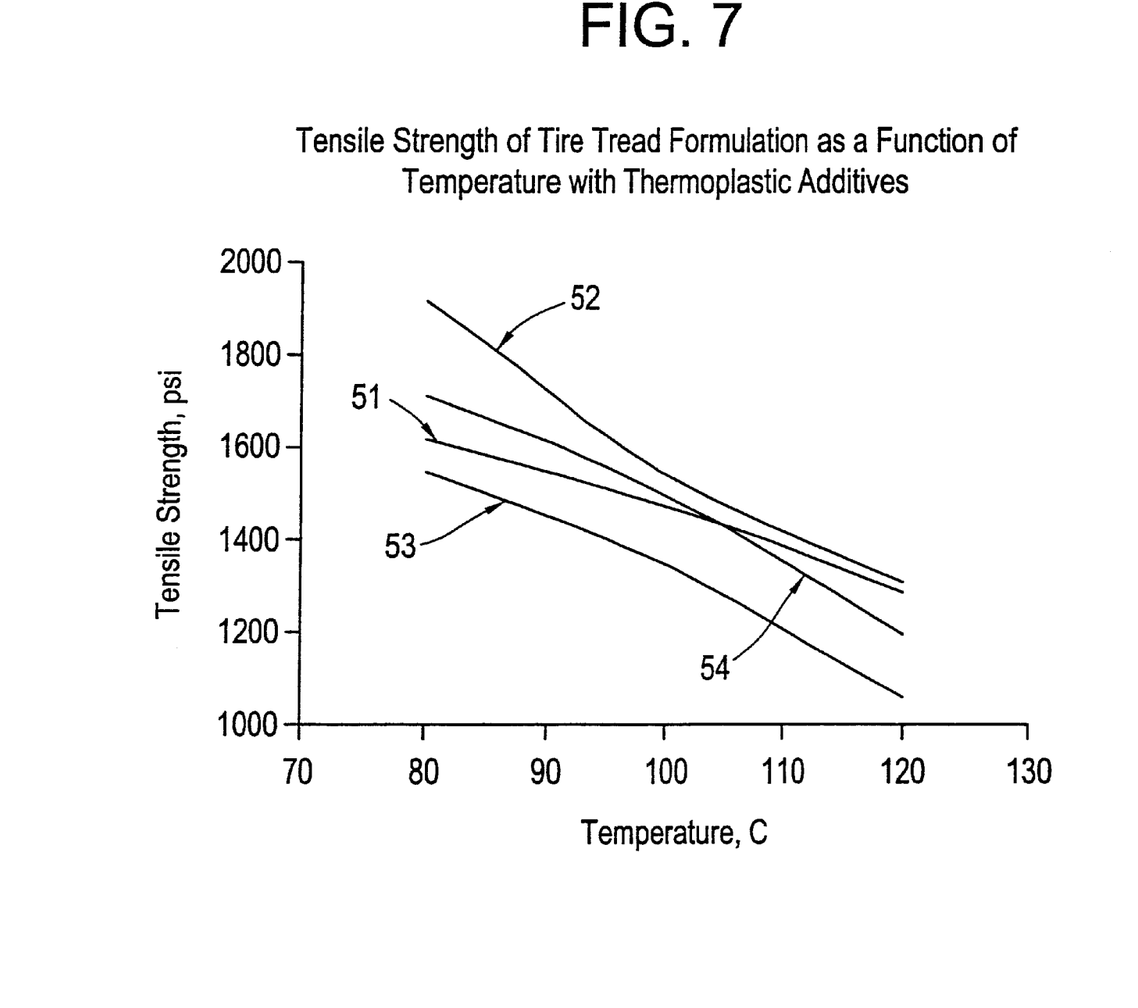
FIG. 7 is a graphical illustration of tensile strength versus temperature for various materials including carbon black, polystyrene, and polyphenylene ether.

By forming a composition of poly(arylene ether) and styrene-butadiene copolymer, and optionally the carbon black, a higher tan δ can be obtained at low temperatures. Further comparison of the effects of temperature and tensile strength for various materials is set forth in FIG. 7. This figure shows that the replacement of carbon black with poly(phenylene ether) shows better tensile strength at higher temperatures than similar formulations containing polystyrene, leading to better wear resistance. Line 51 represents the control (70 parts per hundred (phr) carbon black (N220)), Line 52 represents polyphenylene ether (53 phr carbon black and 17 phr PPE (Tg=165° C.)), and line 53 represents low molecular weight (Mw) polystyrene (53 phr carbon black and 17 phr PS (Tg=60° C., Mw=about 800 to about 5,000)), while line 54 represents high molecular weight polystyrene (53 phr carbon black and 17 phr PS (Tg=106° C., Mw=about 280,000)).

The present application, contrary to prior art teachings, establishes that styrene-butadiene random copolymer and poly(arylene ether) can be combined to form a composition having good properties. The addition of poly(arylene ether) to the styrene-butadiene copolymer improves tensile strength over a wide range of temperatures, poly(arylene ether) allows a Tg shift of +10° C. and that poly(arylene ether) domains present as meso (10–100 nm) sizes to act as good reinforcement. Previously, the rubber and poly(arylene ether) could not be successfully combined due to the need to process the poly(arylene ether) at temperatures exceeding the burning point of the rubber. Contrary to the general perception in the art, poly(arylene ether) and styrene-butadiene copolymer compositions can be produced by, for example, combining low intrinsic viscosity poly(arylene ether) (i.e., an IV of about 0.35 dl/g or less), with styrene-butadiene copolymer at a temperature above the copolymer burning temperature. The resultant composition has improved tan δ at low temperature (e.g., 0° C.), with similar tan δ at high temperatures (e.g., 80° C.), Additional advantages of these compositions include, improved wet grip, rolling resistance, and wear resistance. among others.

While preferred embodiments have been shown and described, various modifications and substitutions may be made thereto without departing from the spirit and scope of the invention. Accordingly it is to be understood that the present invention has been described by way of illustration and not limitations.

What is claimed is:

1. An elastomer-thermoplastic composition comprising a blend of 59–66.1 weight percent of a rubber comprising a styrene butadiene random copolymer rubber with a styrene content over 9%; 4–20.2 weight percent of a poly(arylene ether) resin; and 20–33 weight percent of carbon black, wherein weight percent is based on the combined weight of rubber, poly(arylene ether) and carbon black.

2. The elastomer-thermoplastic composition of claim 1, wherein the poly(arylene ether) resin has an intrinsic viscosity below about 0.35.

3. The elastomer-thermoplastic composition of claim 2, wherein the intrinsic viscosity is about 0.05 to about 0.35.

4. The elastomer-thermoplastic composition of claim 1, wherein the poly(arylene ether) comprises a plurality of structural units of the formula (I):

(I)

wherein for each structural unit, each $Q^1$ is independently halogen, primary or secondary alkyl containing up to 7 carbon atoms, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

5. The elastomer-thermoplastic composition of claim 1, further comprising anti-oxidants, flame retardants, drip retardants, dyes, pigments, colorants, stabilizers, small particle minerals, antistatic agents, plasticizers, lubricants, extending oils, vulcanizing agents, cure accelerators, age protectors, gelling agents, and fillers.

6. The elastomer-thermoplastic composition of claim 5, wherein the vulcanizing agent is sulfur or a sulfur containing compound.

7. The composition of claim 1, wherein the rubber further comprises polybutadiene.

8. The composition of claim 1, wherein the composition has a tan δ of about 0.13 at 80° C. and a tan δ of about 0.18 at 0° C.

9. A method of making an elastomer-thermoplastic composition comprising:
    mixing a rubber mixture comprising 59–66.1 weight percent of powdered rubber comprising a styrene butadiene random copolymer rubber with a styrene content over 9% and 20–33 weight percent of carbon black at a first temperature of about 50–150° C.;
    adding 4–20.2 weight percent of powdered poly(arylene ether) resin to the rubber mixture and mixing at a second temperature of about 130–250° C., wherein the second temperature is higher than the first temperature.

10. The method of claim 9, further comprising
    decreasing the temperature after mixing at a second temperature to a third temperature of about 110° C. or less;
    adding a vulcanization agent; and
    mixing at the third temperature.

11. The method of claim 10, further comprising curing the composition.

12. The method of claim 10, wherein the vulcanizing agent is sulfur or a sulfur containing compound.

13. The composition produced by the method of claim 10.

14. The method of claim 9, wherein the rubber mixture further comprises a cure activator and a cure accelerator.

* * * * *